United States Patent [19]

Hoffman et al.

[11] Patent Number: 4,666,612
[45] Date of Patent: May 19, 1987

[54] METHOD FOR RECOVERING A WOOD PRESERVATIVE FROM WASTE SLUDGES

[75] Inventors: Donald G. Hoffman, Indianapolis, Ind.; Thomas L. Hurst, Oklahoma City, Okla.

[73] Assignee: Kerr-McGee Chemical Corporation, Oklahoma City, Okla.

[21] Appl. No.: 840,013

[22] Filed: Mar. 17, 1986

[51] Int. Cl.$^4$ .............................................. C02F 11/12
[52] U.S. Cl. ..................................... 210/768; 210/773; 210/774; 210/790; 210/806; 162/16; 162/189
[58] Field of Search ....................... 162/16, 29, 41–45, 162/161, 189; 210/749, 724, 765, 766, 773, 774, 790, 799, 800, 768, 804–806, 928, 743

[56] References Cited

U.S. PATENT DOCUMENTS

| | | | |
|---|---|---|---|
| 3,830,688 | 8/1974 | Mannbro | 162/29 |
| 3,876,497 | 4/1975 | Hoffman | 162/189 |
| 3,929,586 | 12/1975 | Slikkers, Jr. | 210/774 X |
| 4,155,804 | 5/1979 | Edge, Jr. | 162/16 |
| 4,237,618 | 12/1980 | Moffet | 210/790 X |
| 4,402,834 | 9/1983 | Bastgen et al. | 210/790 X |
| 4,481,072 | 11/1984 | Grudinin et al. | 210/928 X |
| 4,525,278 | 6/1985 | Frost, III | 210/805 X |
| 4,578,253 | 3/1986 | Gill et al. | 210/806 X |

OTHER PUBLICATIONS

Kirk–Othmer, Encyclopedia of Chemical Technology vol. 19, pp. 554–564, 2d (1969).

Primary Examiner—Tom Wyse
Attorney, Agent, or Firm—William G. Addison; John P. Ward

[57] ABSTRACT

The present invention provides a method for the recovery of a wood preservative chemical from aqueous waste sludges containing said wood preservative chemical in both its liquid and solid phases. The method comprises treating said aqueous waste sludges to effect an initial separation and recovery of the liquid and solid phases, individually. The recovered liquid phase comprises the first liquid phase product stream. The recovered solid phase then is subjected to elevated temperatures sufficient to liquefy the solid phase, said liquefied solid phase comprising the second liquid phase product stream. During the liquefaction of the recovered solid phase, it may be contacted with a quantity of a fresh wood preservative chemical, a portion of a dehydrated first liquid phase product stream or a portion of a dehydrated second liquid phase product stream to prevent the precipitation of any normally solid constituents therein and to enhance the liquefaction of said recovered solid phase.

14 Claims, 1 Drawing Figure

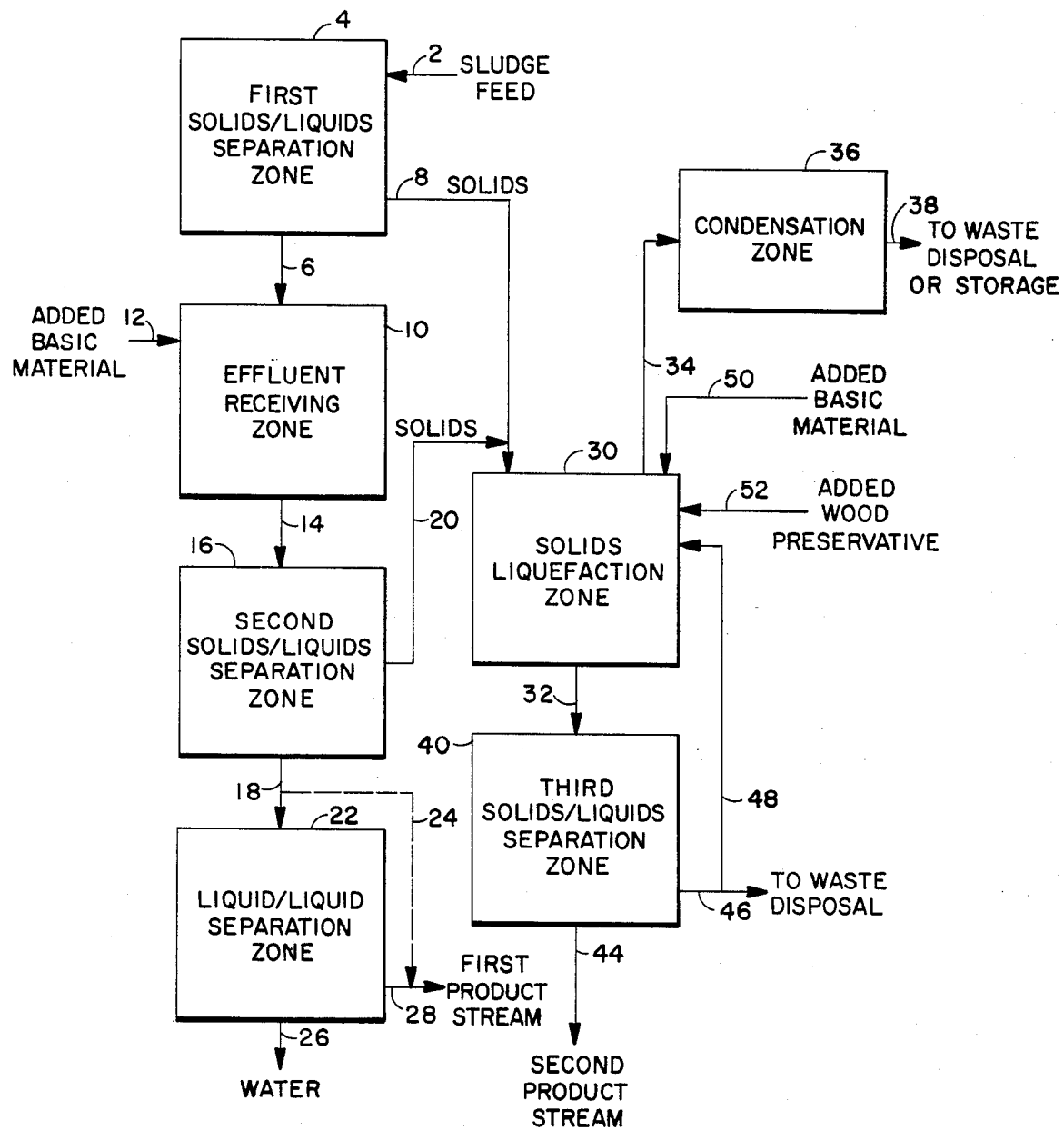

METHOD FOR RECOVERING A WOOD PRESERVATIVE FROM WASTE SLUDGES

FIELD OF THE INVENTION

This invention relates to the recovery of a wood preservative chemical from wastes generated in wood preserving processes. More particularly, this invention relates to a method for recovering a wood preservative chemical from waste sludges containing said wood preservative chemical.

BACKGROUND OF THE INVENTION

Wood preservative chemicals such as creosote, creosote-coal tar solutions, creosote-petroleum oil solutions, pentachlorophenols, pentachlorophenol-petroleum oil solutions and the like, have been widely used to treat a variety of wood products. These products include, for example, railroad ties, switch ties, poles, posts, structural timbers, and the like. However, in the course of treating such wood products with these particular wood preservative chemicals, substantial quantities of waste waters are produced which can contain anywhere from trace amounts to about 50 percent or more of these wood preservative chemicals.

One method for handling these contaminated waste waters has been to contain them in surface impoundments or ponds. With time, these waste waters can, and do, undergo separation into discrete layers of water and a wood preservative chemical. Once formed, these discrete layers then can be, and generally are, separately withdrawn from the impoundment or pond. The water layer recovered from the impoundment or pond is treated for subsequent disposal while the wood preservative chemical layer is, most usually, dehydrated and then recycled for reuse in the treatment of further wood products.

The above method for the recovery of the wood preservative chemical from such surface impoundments or ponds is both limited and inefficient at best. This is due in part to the fact that a substantial portion of the wood preservative chemical in the waste waters contained in the surface impoundment or pond forms a stable water emulsion. This water emulsion settles onto the bottom of the impoundment or pond as a thick, congealed semisolid or sludge. Usually, no effort is made to recover the wood preservative chemical from this sludge even though it can comprise from about 40 to about 90 percent by weight of the total weight of the sludge. In those instances where the sludge is removed from the surface impoundment or pond such as, for example for purposes of closing the impoundment or pond, the sludge merely is solidified for subsequent storage in environmentally secured waste sites.

SUMMARY OF THE INVENTION

The present invention provides a method for efficiently and economically separating and recovering a wood preservative chemical contained in an aqueous waste sludge, and wherein the chemical is present in the sludge in both its liquid and solid phases.

The method comprises introducing the aqueous waste sludge into a first separation zone to effect a first separation of the sludge. This first separation provides a first effluent stream comprising a major portion of the solid phase of the wood preservative chemical and a minor portion of the water in the sludge and a second effluent stream comprising the liquid phase of the wood preservative chemical and a major portion of the water in the sludge. Generally, the second effluent stream also will contain a remaining minor portion of the solid phase of the wood preservative chemical.

The second effluent stream then is introduced into a second separation zone wherein the remaining minor portion of the solid phase of the wood preservative chemical is separated therefrom. This remaining minor portion of the solid phase of the wood preservative chemical then is withdrawn from the second separation zone as a third effluent stream. The liquid phase, consisting essentially of the liquid wood preservative chemical and water, is recovered as a first liquid phase product stream.

The recovered first and third effluent streams are mixed together to form a feed stream of the combined solid phases of the wood preservative chemical. This feed stream is introduced into a liquefaction zone maintained at an elevated temperature sufficient to effect substantial liquefaction of the feed stream. The resulting liquefaction product will comprise a liquid phase of the wood preservative chemical having suspended therein a remaining minor portion of the solid phase of the wood preservative chemical. This liquefaction product is withdrawn from the liquefaction zone as a fourth effluent stream and introduced into a third separation zone to remove the suspended, remaining minor portion of the solid phase of the wood preservative chemical therefrom, and provide a second liquid phase product stream consisting essentially of the wood preservative ehcmical and some water.

In a further embodiment of this invention, the second effluent stream comprising the liquid phase of the wood preservative chemical and a major portion of the water in the sludge and having suspended therein the remaining minor portion of the solid phase of the wood preservative chemical, can be introduced into an effluent receiving zone prior to its introduction into the second separation zone. In this effluent receiving zone the second effluent stream is mixed with sufficient quantities of a basic or alkaline material to adjust the solution pH of this second effluent stream to a substantially neutral or slightly alkaline value. One purpose of this neutralization is to prevent emulsification of the liquid phase of the wood preservative chemical, which can occur at low solution pH's, during the subsequent processing thereof or storage of the first liquid phase product stream. The neutral or slightly alkaline second effluent stream then is withdrawn from the effluent receiving zone and introduced into the second separation zone. Any remaining minor portion of the solid phase of the wood preservative chemical remaining suspended in the second effluent stream then is removed in the second separation zone as disclosed above.

In still a further embodiment of the present invention, there can be added to the liquefaction zone, contemporaneously with the addition thereto of the feed stream of combined solid phases of the wood preservative chemical, at least one additive material. The additive materials can include the basic or alkaline materials discussed above as well as fresh wood preservative chemicals, dehydrated portions of the first and second liquid phase product streams, and any combinations thereof. The use of these additive materials both shortens the time required to complete the liquefaction and improves the pumpability of the liquefaction product stream recovered from the liquefaction zone. Also, the use of these additive materials prevents precipitation of normally solid components present in the wood preservative chemical undergoing recovery.

DESCRIPTION OF THE DRAWING

The single FIGURE is a schematic illustration of the process steps and flow of materials in a preferred embodiment of this invention.

DETAILED DESCRIPTION OF THE INVENTION

It now has been discovered that wood preservative chemicals, contained in waste sludges removed from surface impoundments or ponds provided for receiving waste water streams from wood preserving processes, can be recovered efficiently and economically by use of the method of the present invention. For a more complete understanding of the method of the present invention the following description is based upon reference to the single FIGURE illustrating a preferred embodiment of this invention. However, it is to be understood that the method of the present invention is not limited to this preferred embodiment.

Referring now to the single Figure, a waste sludge feed is conveyed by way of line 2 to first solids/liquid separation zone 4. Broadly, waste sludges capable of treatment in accordance with the method of this invention will comprise those sludges recoverable from the bottom of surface impoundments or ponds provided for receiving waste water streams generated by wood preserving processes. These sludges, which are thick, congealed semisolids having a heavy grease-like appearance, are comprised of intimate mixtures of water and a wood preservative chemical such as, for example, creosote and pentachlorophenol wherein the wood preservative chemical is present in the mixtures in both its liquid and solid phases. Typical examples of waste sludges which can be treated in accordance with the method of this invention are those sludges comprised of from about 6 to about 80 weight percent of water, from about 10 to about 90 weight percent of liquid creosote, and from about 2 to about 30 weight percent of solids comprised mostly of creosote tars and some debris. Other waste sludges, such as those containing pentachlorophenol in both its liquid and solid phases also can be treated in accordance with the method of the present invention.

Within first solids/liquids separation zone 4, the sludge is divided into its constituent liquid and solid phases. For purposes of this invention, any of the known filtering or screening type apparatus for separating solids and liquids can be used as first solids/liquids separation zone 4. However, due to the grease-like nature of the sludge, it is preferred to use as first solids/liquids separation zone 4 an apparatus known as a shaking or vibrating screen. Of this type of apparatus the most useful are those containing two or more movable screens of different size openings stacked one above the other. The use of this type of apparatus provides not only for the maximum degree of separation between the liquid and solid phases in the sludge, but does so in the most efficient and economical manner.

Following separation of the liquid and solid phases in the sludge in first solids/liquids separation zone 4, the separated solid phase or first effluent stream, comprising a major portion of the solid phase of the wood preservative chemical; some water; and debris, is withdrawn therefrom and conveyed by way of line 8 to solids liquefaction zone 30. The separated liquid phase or second effluent stream, comprising the liquid phase of the wood preservative chemical; a major portion of the water; and suspended therein a minor portion of the solid phase of the wood preservative chemical, produced in first solids/liquids separation zone 4 is withdrawn therefrom and conveyed through conduit 6 to effluent receiving zone 10.

In the preferred embodiment of this invention, as illustrated in the single Figure, there also is introduced into effluent receiving zone 10 by way of conduit 12, a basic or alkaline material capable of providing for adjustment of the solution pH of the second effluent stream. Sufficient basic or alkaline material is added to effluent receiving zone 10 to adjust the solution pH of the second effluent stream therein to a value within the range of from about 7.0 to about 9.0. Generally, the pH of this second effluent stream, as well as that of the first effluent stream, will be in the range of about 4.0 to about 6.3. It has been found that in the subsequent processing of these effluent streams, problems with the formation of stable water emulsions or the precipitation of normally solid constituents in the wood preservative chemicals themselves can occur if adjustment of these pH values to values in the range set forth above is not made. With regard to the second effluent stream, the adjustment of the solution pH thereof conveniently can be made by the addition of the basic or alkaline material thereto in effluent receiving zone 10.

The basic or alkaline material introduced into effluent receiving zone 10 can be any material having the capability of adjusting the pH of the second effluent stream from a value ranging from about 4.0 to about 6.3 to a neutral or slightly alkaline value in the range of from about 7.0 to about 9.0. Basic or alkaline materials useful in the practice of this invention include solutions of alkali metal and alkaline earth metal compounds such as alkali metal carbonates and hydroxides, alkaline earth metal oxides and hydroxides, and the like. Representative, but nonlimiting, examples of such basic or alkaline materials are solutions of sodium hydroxide, sodium carbonate, potassium hydroxide, potassium carbonate, calcium oxide, calcium hydroxide and the like. A most economical and readily available basic or alkaline material for use in this invention is sodium hydroxide.

The amount of basic or alkaline material added to the second effluent stream will vary depending upon the initial pH of the second effluent stream, the particular basic or alkaline material used and the strength of the solution containing the basic or alkaline material. For example, using a 50 percent by weight caustic soda solution, it is possible to adjust the pH of a pentachlorophenol effluent stream from an initial value of about 4 to a value of about 7.2 to 7.5 by the addition thereto of from about 2.0 to about 2.5 percent by weight of the solution. Utilizing a caustic soda solution of a different strength or the treatment of an effluent stream having a lower or higher initial pH will, of course, require the addition of a different amount to attain the same or similar final pH value. However, it is within the skill of those in this art to readily determine the precise amounts required for any given basic solution knowing the initial pH of the second effluent stream to be treated.

Following adjustment of the solution pH of the second effluent stream, this stream is conveyed through line 14 to second solids/liquids separation zone 16. Within second solids/liquids separation zone 16, which preferably may comprise one or more of the well-known self-cleaning type filtering apparatus, the remaining minor portion of the solid phase of the wood preservative chemical suspended in the neutral or slightly alkaline second effluent stream is separated therefrom. The separated solid phase, referred to herein as the third effluent stream, is conveyed from second solids/liquids separation zone 16 to line 8 through communicating line 20. In line 8, or a suitable mixing zone (not shown), the first and third effluent streams are combined to provide the feed stream introduced to solids liquefaction zone 30 discussed hereinbelow.

The neutral or slightly alkaline liquid phase remaining, after separation of the minor portion of the solid phase of the wood preservative chemical, in second solids/liquids separation zone 16 is withdrawn therefrom through line 18. This neutral of slightly alkaline liquid phase comprises the liquid phase fo the wood preservative chemical and the major portion of the water in the waste sludge feed to the process. When the amount of water in this liquid phase is in excess of about 70 percent by volume, this liquid phase is conveyed by way of line 18 to liquid/liquid separation zone 22. Within the liquid/liquid separation zone 22, the water content of the neutral or slightly alkaline liquid phase is reduced to a level below about 70 percent by volume. The resulting de-watered liquid phase is withdrawn therefrom by way of line 28 and recovered as the first liquid phase product stream. The water removed from the neutral or slightly alkaline liquid phase in liquid/liquid separation zone 22 is withdrawn through line 26.

To facilitate the separation and removal of the water content of the neutral or slightly alkaline liquid phase, at least one coagulating or flocculating agent can be introduced into liquid/liquid separation zone 22 through a line not shown. Such coagulating or flocculating agent can be any of the well-known inorganic compounds or cationic organic polyelectrolytes employed in conventional water clarification processes. Thus, in the practice of the present invention there can be added to liquid/liquid separation zone 22, as a coagulating or flocculating agent, an inorganic compound such as alum, sodium aluminate, ferric sulfate, and the like, and cationic organic polyelectrolytes such as the various known polyamines including poly(alkylene polyamines), poly(hydroxyalkylene polyamines), and polyamine quaternaries. A more complete description of the polyamines can be found in *Kirk-Othmer, Encyclopedia of Chemical Technology*, Vol. 19, pp. 554–564, 2d (1969) which is incorporated herein by reference. Further useful cationic organic polyelectrolytes are amino resins such as the various polyamides as represented by polyacrylamide, poly(melamine formaldehyde) and poly(urea formaldehyde) resins.

The amount of coagulating or flocculating agent which can be introduced into liquid/liquid separation zone 22 can vary broadly. In general, however, the amount will be at least an amount sufficient to enhance the separation between the water and liquid phase of the wood preservative chemical comprising the neutral or slightly alkaline liquid phase undergoing treatment. While the most effective amount will depend upon the relative quantities of water and liquid phase wood preservative chemical comprising the neutral or slightly alkaline liquid phase, this amount can readily be determined by one of skill in this art utilizing known settling test procedures.

In an alternative embodiment when the amount of water in the neutral or slightly alkaline liquid phase withdrawn from second solids/liquids separation zone 16 is, at the outset, below about 70 percent by volume, liquid/liquid separation zone 22 may be bypassed entirely. In such event, the neutral or slightly alkaline liquid phase withdrawn from second solid/liquids separation zone 16 through line 18 constitutes the first liquid phase product stream and is conveyed therefrom through line 24 directly to line 28.

Whether the neutral or slightly alkaline liquid phase withdrawn from second solids/liquids separation zone 16 is first passed through liquid/liquid separation zone 22 or conveyed directly to line 28 to provide the first liquid phase product stream, it generally is preferred to subject this stream to a final dehydration step (not shown). The purpose of this final dehydration step is to further reduce the water content of this first liquid phase product stream to a level in the range of from about 3 to about 5 percent or less by volume to provide a dehydrated first liquid phase product. Reduction of the water content to this level renders the dehydrated first liquid phase product particularly suited for direct blending with fresh liquid wood preservative chemical for subsequent use in a wood preserving treatment process and for addition to solids liquefaction zone 30 as described below.

The first and third effluent streams, disclosed hereinabove, are combined either in line 8 or a suitable mixing zone (not shown) to form a single feed stream. This single feed stream is introduced into solids liquefaction zone 30 which can comprise any vessel or tank for receiving said feed stream and for effecting liquefaction of said feed stream to liquid products. Within solids liquefaction zone 30, which preferably is equipped with agitation means (not shown), the feed stream of the combined solid phases of the wood preservative chemical is heated to temperatures ranging from about 160° F. to about 210° F. to effect a conversion of said feed stream to a liquefaction product. This liquefaction product will comprise substantially a liquid phase of the wood preservative chemical having suspended therein a minor portion of a solid phase of the wood preservative chemical.

To facilitate the liquefaction of the feed stream of combined solid phases in liquefaction zone 30, which feed stream will have a pH of from about 4.0 to about 6.3, a quantity of at least one basic or alkaline material as defined hereinabove also can be introduced into solids liquefaction zone 30. As illustrated in the single Figure, the basic or alkaline material can be introduced into solids liquefaction zone 30 through line 50. The quantity of basic or alkaline material added to solids liquefaction zone 30 will be an amount sufficient to adjust the pH of the liquefying mass within solids liquefaction zone 30 to a neutral or slightly neutral value in the range of from about 7.0 to about 9.0. Guidelines for determining the amounts needed to accomplish this pH adjustment are set forth above.

The addition of the basic or alkaline material to solids liquefaction zone 30 has been found to both shorten the time required to carry out the liquefaction and improve the pumpability of the liquefaction product stream recovered from zone 30. Also, it has been observed that the use of the basic or alkaline material acts to prevent precipitation of normally solid constituents, e.g., naphthalene, present in the wood preservative itself.

To further facilitate the liquefaction of the feed stream, a quantity of at least one liquid additive material selected from the group consisting of fresh liquid wood preservative, the dehydrated first liquid phase product described above and a dehydrated second liquid phase product described hereinbelow also can be introduced into solids liquefaction zone 30. As used throughout the remainder of this description and appended claims, the phrase "fresh liquid wood preservative chemical" means virgin wood preservative chemical, i.e., a wood preservative that previously has not bee employed in a wood preserving process, as well as a recycle wood preservative, i.e., a wood preservative chemical which previously has been employed in such a preserving process and that was recovered directly therefrom after use.

When employing the above liquid additive materials in the process of this invention, it is preferred to preheat (by means not shown) these materials prior to their introduction into solids liquefaction zone 30 through line 52. Generally, these additive materials will be heated to temperatures approximately equivalent to the temperature of the liquefying mass or mixture in solids liquefaction zone 30. Thus, in the practice of this invention, the above described liquid additive materials will be preheated to a temperature in the range of from about 160° F. to about 210° F.

The amount of liquid additive material introduced into solids liquefaction zone 30 through line 52 can vary broadly. In general, however, the amounts introduced will be those amounts sufficient to provide a ratio, by volume, of the liquid additive material to the combined solid phase feed stream undergoing liquefaction in solids liquefaction zone 30 of at least about 1.0:1.0 and preferably a ratio in the range of from at least about 1.0:1.0 to about 1.0:10.0. When the feed stream of the combined solid phases is comprised of pentachlorophenol, it is, however, preferred to utilize a ratio of the liquid additive material to the feed stream ranging from at least about 1.0:1.0 to about 1.0:3.0.

The hot, liquefied wood preservative chemical produced in solids liquefaction zone 30 is withdrawn as a fourth effluent stream by means of line 32 and conveyed thereby to third solids/liquids separation zone 40. This fourth effluent stream substantially will comprise a liquid phase of the wood preservative chemical having suspended therein, a minor amount of a solid phase of the wood preservative chemical in the form of undissolved tar particles.

Hot, volatile, organic carbon vapors and fumes generated in solids liquefaction zone 30 are withdrawn through line 34 and conveyed to condensation zone 36. Condensation zone 36 can comprise any apparatus or device for condensing these hot vapors or fumes and can include, for example, water spray condensers, venturi scrubbers, surface condensers, and the like. The liquefied or condensed vapors or fumes continuously are removed from condensation zone 36 by way of line 38 for subsequent disposal by means not shown or to storage (not shown).

As disclosed hereinabove, the hot, fourth effluent stream recovered from solids liquefaction zone 30 substantially will be comprised of a liquid phase of the wood preservative chemical having suspended therein, a minor amount of a solid phase of the wood preservative chemical in the form of undissolved tar particles. Within third solids/liquids separation zone 40, which also can be an apparatus of the self-cleaning type disclosed hereinabove, these undissolved tar particles are separated from the fourth effluent stream and withdrawn from third solids/liquids separation zone 40 through line 46. These tar particles either can be disposed of an waste materials by means not shown or returned to solids liquefaction zone 30 by way of communicating line 48. In a preferred embodiment, at least a portion of the tar particles are returned to solids liquefaction zone 30 for further treatment, i.e., conversion to the liquid phase.

The liquid phase portion of the fourth effluent stream, which portion comprises the second liquid phase product stream, is withdrawn from third solids/liquids separation zone 40 through line 44. In general, this second liquid phase product stream will be subjected to a dehydration step (not shown) to provide a dehydrated second liquid phase product. This dehydrated second liquid phase product can be blended directly with fresh wood preservative chemical for use in a wood preservative treatment process. In addition, at least a portion of the dehydrated second liquid phase product can be employed as the added wood preservative introduced into solids liquefaction zone 30 as disclosed above. Whether employed for purposes of blending or addition to solids liquefaction zone 30, it is desirable that the dehydrated second liquid phase product not contain in excess of about 3 to about 5 percent by volume of water.

While the present invention has been described with regard to specific embodiments thereof, it is to be understood that changes and modifications can be made thereto without departing from the spirit and scope of the invention.

What is claimed is:

1. A method for treating an aqueous waste sludge containing both liquid and solid phases of a wood preservative chemical and water, said sludge being recovered from a surface impoundment for receiving waste water streams from a wood preserving process, said method comprising:
    introducing said aqueous waste sludge into a first separation zone to effect a separation of said sludge into a first effluent stream comprising a major portion of the solid phase of said wood preservative chemical and a minor portion of the water in said sludge and a second effluent stream comprising the liquid phase of said wood preservative chemical and a major portion of the water in said sludge and having suspended therein a remaining minor portion of the solid phase of said wood preservative chemical;
    withdrawing the second effluent stream from said first separation zone and introducing said second effluent stream into a second separation zone to effect a separation of the second effluent stream into a third effluent stream comprising the remaining minor portion of said solid phase of wood preservative chemical and a liquid phase stream comprising the liquid phase of said wood preservative chemical and the major portion of the water;
    recovering said liquid phase stream as a first liquid phase product stream;
    mixing said first effluent stream with said third effluent stream to form a feed stream of combined solid phases of said wood preservative chemical and the minor portion of the water;
    introducing said feed stream into a liquefaction zone maintained at an elevated temperature sufficient to effect substantial liquefaction of said combined solid phases and to provide a fourth effluent stream comprising a liquid phase of said wood preservative chemical and the minor portion of the water and having suspended therein a minor portion of the solid phase of said wood preservative chemical;

withdrawing the fourth effluent stream from said liquefaction zone and introducing said fourth effluent stream into a third separation zone to effect a removal of said suspended minor portion of the solid phase of said wood preservative chemical from said effluent stream and provide a second liquid phase product stream comprising a liquid phase of said wood preservative chemical and the minor portion of the water; and recovering said second liquid phase product stream.

2. The method of claim 1 wherein the second effluent stream withdrawn from the first separation zone is characterized by a pH ranging from about 4.0 to about 6.3.

3. The method of claim 2 wherein the pH of said second effluent stream is adjusted to a value ranging from about 7.0 to about 9.0 prior to introducing said second effluent stream into said second separation zone.

4. The method of claim 3 wherein adjustment of the pH of said second effluent stream comprises adding to said second effluent stream at least one basic or alkaline material selected from the group consisting of alkali metal and alkaline earth metal oxides, hydroxides and carbonates, and ammonium hydroxide.

5. The method of claim 1 wherein the step of recovering said first liquid phase product stream further is defined as:

subjecting the first liquid phase product stream to dehydration to effect a substantial removal of the major portion of water in said product stream and provide a dehydrated first liquid phase product stream containing from about 3 to about 5 percent by volume or less water; and recovering said dehydrated first liquid phase product stream.

6. The method of claim 1 wherein the step of recovering said second liquid phase product stream further is defined as:

subjecting the second liquid phase product stream to dehydration to effect a substantial removal of the minor portion of the water in said product stream and to provide a dehydrated second liquid phase product stream containing from about 3 to about 5 percent by volume or less water; and recovering said dehydrated second liquid phase product stream.

7. The method of claim 1 wherein the feed stream of combined solid phases introduced into the liquefaction zone is characterized by a pH ranging from about 4.0 to about 6.3.

8. The method of claim 7 wherein the pH of said feed stream of combined solid phases is adjusted, within the liquefaction zone, to a value ranging from about 7.0 to about 9.0.

9. The method of claim 8 wherein adjustment of the pH of said feed stream of combined solid phases within said liquefaction zone comprises introducing into said liquefaction zone at least one basic or alkaline material selected from the group consisting of alkali metal and alkaline earth metal oxides, hydroxides and carbonates, and ammonium hydroxide.

10. The method of claim 1 wherein said liquefaction zone is maintained at an elevated temperature of from about 160° F. to about 210° F.

11. The method of claim 1 wherein the step of introducing said feed stream of combined solid phases into the liquefaction zone to effect substantial liquefaction of said feed stream and provide said fourth effluent stream further is defined as:

introducing into said liquefaction zone, contemporaneously with said feed stream, at least one additive material selected from the group consisting of fresh wood preservative chemical, a dehydrated first liquid phase product stream and a dehydrated second liquid phase product stream heated to an elevated temperature.

12. The method of claim 11 wherein the additive material introduced into said liquefaction zone contemporaneously with said feed stream is heated to an elevated temperature of at least about 160° F.

13. The method of claim 1 wherein the step of introducing the fourth effluent stream into the third separation zone to effect a removal of the suspended minor portion of solid phase wood preservative chemical from said fourth effluent stream further is defined as:

recovering at least a portion of said suspended solid phase wood preservative chemical; and introducing said portion into said liquefaction zone for conversion into further liquid phase wood preservative chemical.

14. The method of claim 1 wherein the wood preservative material contained in said sludge as liquid and solid phases is at least one material selected from the group consisting of creosote, creosote-coal tar solutions, creosote-petroleum oil solutions, pentachlorophenol and pentachlorophenol-petroleum oil solutions.

* * * * *